United States Patent [19]

Piramoon

[11] Patent Number: 5,540,126
[45] Date of Patent: Jul. 30, 1996

[54] AUTOMATIC LAY-UP MACHINE FOR COMPOSITE FIBER TAPE

[75] Inventor: Alireza Piramoon, Santa Clara, Calif.

[73] Assignee: Piramoon Technologies, Mountain View, Calif.

[21] Appl. No.: 249,502

[22] Filed: May 26, 1994

[51] Int. Cl.⁶ ..................................................... B26D 1/06
[52] U.S. Cl. ................... 83/34; 83/621; 83/691
[58] Field of Search ................. 83/34, 691, 687, 83/621, 561, 533, 699.31, 656; 29/598

[56] References Cited

U.S. PATENT DOCUMENTS

| | | | |
|---|---|---|---|
| 2,853,134 | 9/1958 | Deubal | 83/656 |
| 3,447,408 | 6/1969 | Parrent et al. | 83/621 |
| 3,482,311 | 12/1969 | Farris | 83/621 |
| 4,790,808 | 12/1988 | Piramoon | 494/81 |
| 5,349,740 | 9/1994 | Neuenschwander | 83/25 |

FOREIGN PATENT DOCUMENTS 357636  8/1922  Germany ..................... 83/561

*Primary Examiner*—Kenneth E. Peterson
*Attorney, Agent, or Firm*—Townsend and Townsend and Crew

[57] ABSTRACT

An automatic lay-up machine is disclosed for composite material article having anisotropic resistance in tension. A layer of fiber material, either unidirectional or fabric weave, is dispensed between a supply roll and a take-up roll. This material is advanced over a cutting table having at least one and preferably a plurality of cutting molds, each mold cutting a profile of a portion of an article being fabricated and leaving a continuous scrap webbing for gathering at the take-up roll. The material is placed under tension across the cutting table, compressed, and cut at the molds to extract the individual layers having the desired sections utilized in fabricating the article. This process is repeated with the molds indexing in rotation with respect to the material so that successive layers filling the molds align their respective fibers in varying directions. Sufficient scrap material is left between the cutting table and the take up roll that tension can be drawn through the un-severed fiber sections as material is sequentially advanced across the cutting table. Where pre-impregnated composite tape or fabric are used, refrigeration of the supplied tape with following adhering to form a unitary article or article part occurs. Alternately, built up layers of composite layers without resin can be impregnated with resin. This article or article part is then cured as a unitary mass.

5 Claims, 14 Drawing Sheets

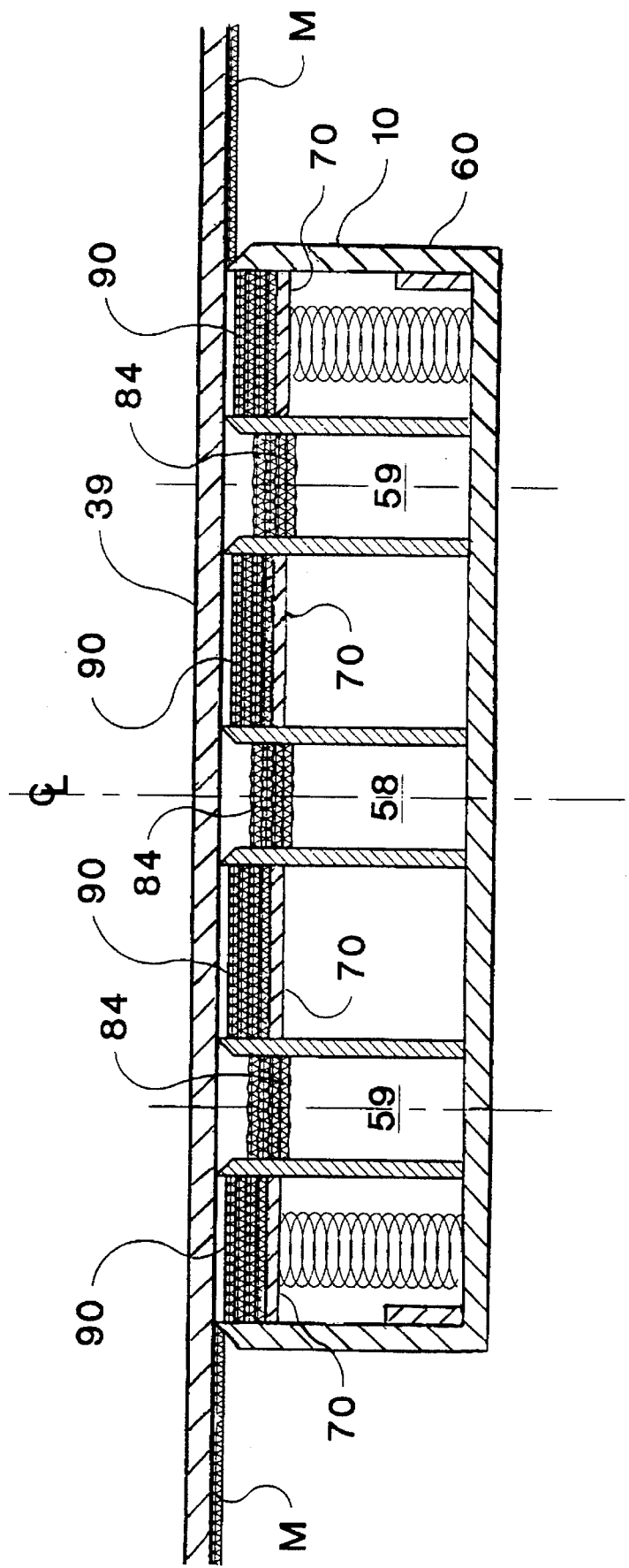

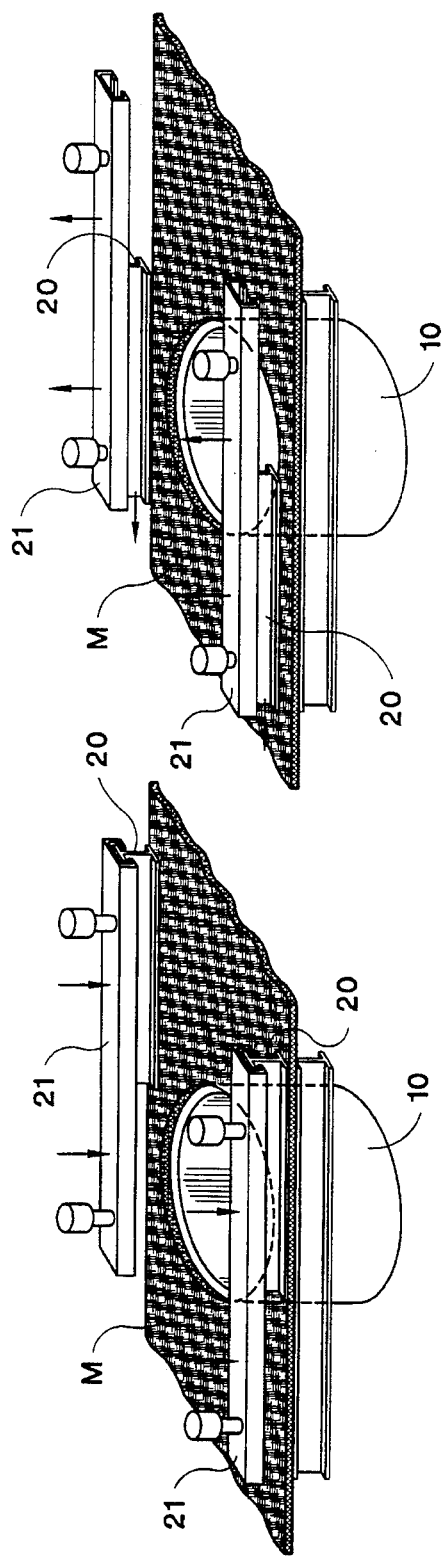
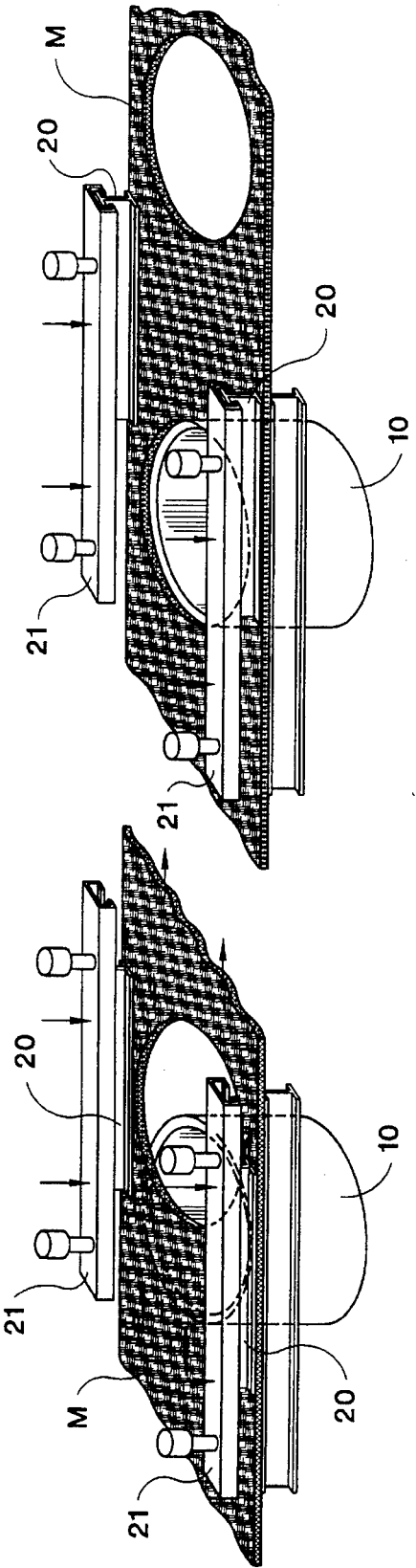
FIGURE 10A
FIGURE 10B
FIGURE 10C
FIGURE 10D

AUTOMATIC LAY-UP MACHINE FOR COMPOSITE FIBER TAPE

This invention relates to the fabrication of composite material articles having high yield, high strength fibers to impart to finished articles an quasi-isotropic strength characteristic. In particular, a machine for layering composite tape or composite fabric is disclosed. The produced articles can be used to impart to resin cured bodies resistance to centrifugal force.

BACKGROUND OF THE INVENTION

Composite fiber layer construction has been used for the production of composite material articles for the resistance of centrifugal forces, such as in the fabrication of centrifuge rotors. See Piramoon U.S. Pat. No. 4,790,808 issued Dec. 13, 1988 entitled Composite Material Centrifuge Rotor. In that disclosure, particularly at FIG. 2, the construction of disc components is illustrated from unidirectional composite fiber layers. Simply stated, successive sheets of pre-impregnated unidirectional composite fiber layers are placed one on top of another. As each successive layer is placed, the angular orientation of the unidirectional fibers are varied—typically by a preselected angular variation. Thereafter, component article parts for a centrifuge rotor are formed. Excess material is machined off to form discrete discs. Separate discs are assembled from which a centrifuge rotor having quasi-isotropic resistance to centrifugal force can be fabricated. The resistance is said to be quasi-isotropic in that the layers act together to resist centrifugal forces—even though the fibers of one layer may be anisotropic in strength parallel to their axes. Continued fabrication includes individually boring a central hub and sample tube apertures peripheral to the central hub.

Essentially, there are two ways to fabricate a part from composite materials. One approach involves molding the part. Variations in this approach includes Resin Injection Molding (RIM) and in-situ Foam Expansion Fabrication (FEF) which utilize thermoset or thermoplastic formulations, such as PolyEtherlEtherKetone (PEEK), PolyPhenylene Sulfide (PPS), Nylon, etc., to form the structure of a product within a woven or braided fabric placed inside a metal mold. So far, high cost, quality, handling and safety issues have limited molding approach to a handful of high-margin specialty applications such as helicopter blade fabrication.

The other method involves dry or resin coated material which is unidirectional tape or woven fabric. In this approach, individual strips of material are fabricated one on top of another to form a solid, composite article with fibers arrayed in different directions in different layers. The stacked fibers are then cured into a unitary mass. Once in a unitary mass, machining of the mass occurs—both on the exterior and the interior—to produce the finished article. In the case of a centrifuge rotor, the outside is finished to a smooth, rounded profile having low windage, while the inside is machined to form apertures for the sample tubes and central hub.

Current lamination equipment, consisting of a lay-up table and a laser or ultrasound cutter poses several problems. These problems include high cost, slowness of the serial motion of the cutter, damaged fiber-ends and premature curing of the resin on the edges.

Regarding such premature curing of the resin, it has been found that heat from the laser or ultrasound cures resin pre-impregnated fiber in the vicinity of the cut. Subsequently, when the multiple layers are laid, and thereafter cured into a unitary mass for the formation of all or part of a rotor, the partially cured edges do not form into the remaining mass of the rotor. The mass of prematurely cured resin and damaged fibers at the edges are typically machined away during the machining of the finished product. Unfortunately, prematurely cured resin, damaged fibers and the presence of the uncured product complicates the machining.

Heretofore, the bulk of the lay-up work in the industry has been done manually. Hand lay-up increases chances of quality problems, potential for contamination, and also adds significant labor content to the final cost of manufacturing.

These hand lay-up problems are further complicated when the desired part contains cavities, such as a hub aperture or sample tube apertures within a centrifuge rotor or cavities for holding magnets within a high speed electric motor. Heretofore, such apertures, together with the outside surface of the rotor have been machined from so-called "billets"—typically masses of the sequentially layered unidirectional composite fiber tape having many rough edges protruding from a cured, central and unitary mass. Machining such a billet to either form cavities within the final composite structure or to finish the outside surface of the composite structure is a highly specialized and rarely practiced art. Unfortunately, this process can and does damage fibers, lower structural integrity and increase content of labor to produce the final composite material part. In addition, disposing of unusable scrap fibers or powder is a serious environmental issue.

SUMMARY OF THE INVENTION

An automatic lay-up machine is disclosed for composite material article having anisotropic resistance in tension. A layer of fiber material, either unidirectional, fabric weave, or resin-impregnated chopped fiber tape is dispensed between a supply roll and a take-up roll. This material is advanced over a cutting table having at least one and preferably a plurality of cutting molds, each mold cutting a profile of a portion of an article being fabricated and leaving a continuous scrap webbing for gathering at the take-up roll. The material is placed under tension across the cutting table, compressed, and cut at the molds to extract the individual layers of tape or fabric having the desired sections utilized in fabricating the article. This process is repeated with the molds indexing in rotation with respect to the material so that successive layers filling the molds align their respective fibers in varying directions. Sufficient scrap material is left between the cutting table and the take up roll that tension can be drawn through the un-severed fiber sections as material is sequentially advanced across the cutting table. Where pre-impregnated composite tape or fibers are used, refrigeration of the supplied tape with following adhering to form a unitary article or article part occurs. Alternately, cut and stacked layers of woven fabric without resin can be impregnated with resin by means of resin transfer molding. This article or article part is then cured as a unitary mass. Such curing can occur in either the original cutting mold or in a special curing mold to which the accumulated layers are transferred for curing. Upon cure, clean up finishing of the article or article part can occur with separate article parts later being joined to form the finished article.

It should be noted that the continuous scrap roll is not wasted; it can be ground and used as fiber material.

Accordingly, the disclosed apparatus and process cuts to shape, indexes, stacks, debulks both pre-impregnated composite fiber tape and/or woven composite fabric. Further, transverse motion of the die is provided between strips of materials having different strength characteristics. Thus successive layers can have placement of differing fibers in differing layers from differing layer sources to fabricate structural composite material components. In addition, a single die can have multiple sections of material form a discrete layer.

Further, an automated apparatus is disclosed that eliminates the laborious and slow process of hand lay-up, especially when dealing with thick laminates. This apparatus can automatically laminate composite fiber tape or woven composite fabric in different widths and thicknesses with a minimum of waste. The disclosed apparatus is capable of electro-mechanical, computer controlled lay-up, capable of operating in a fully automated mode.

Laminates produced by the apparatus and process can vary in wide latitude. For example high quality, near-net or net-shape laminates are easily cut with a minimum of waste, stacked, debulked and placed in a compact format where they can be cured to a unitary mass. Thus, the apparatus can produce laminate layers that closely conform to the dimensions or net shape of the final composite fiber part.

Because of the ability to shape each particular laminate to the known profile of a finished composite article, the gathered, debulked, and cured articles or article portions reduce or eliminate post-lamination machining. This is especially useful in fabrication of parts with multiple cavities such as centrifuge rotors or other structural parts. This also reduces the amount of scrap material and contributes to lower cost of production.

Since the profile of the article or article part laminates extracted by the apparatus and process of this invention includes both the exterior profile and interior apertures and construction, article design can facilitate better curing. Uniform curing requires minimization of thick cross sections to avoid long flow paths for resin bleeding during the curing step. For example, two directional resin bleeding for parts with cavities can occur. Since in curing, excess resin flows to an article boundary, article design can include complex profiles specifically designed to accommodate such required resin flow. The benefit is more uniform curing for better structural integrity in the finished article. For example, the disclosed apparatus and process is capable of producing individual discrete laminate layers with punched drive hub and sample tube holes for a centrifuge rotor in a single step. As a consequence, and during the curing cycle, the resin can bleed in two directions. For example, resin can bleed to the rotor exterior as well as to and toward the sample apertures, resulting in an overall shorter flow-path for excess resin flow through the laminates. Shorter travel by the resin minimizes chances of air gaps, resin bulging or fiber kinking, thus resulting in quality articles or article parts with higher structural integrity.

The disclosed apparatus and process has the flexibility of utilizing either pre-impregnated material or alternatively utilizing dry material—with both materials containing the composite fiber construction. As a consequence, apparatus and process may be combined with resin transfer molding in a practical way for producing structurally and aerodynamically sound products, including light weight, high volume high-energy centrifuge rotors.

This disclosed apparatus increases productivity by allowing different width tapes and multiple dies with different sizes, producing multiple laminates.

It will also be understood that the disclosed apparatus and process enable the cross sectional dimension to be varied within wide latitudes—and not merely restricted to the width of the material. For example, the disclosed apparatus and process produces wider laminated parts than actual width of the tape by means of possible transverse motion of the die plate.

The disclosed apparatus totally eliminates contamination problems. Since the process is fully automated and does not require human contact with the individual laminates as they are formed, quality problems associated with human lay-up are removed. For example, where pre-impregnated fiber is utilized, touching of the resin can cause deterioration of the abilities to completely bond and subsequently cure to a unitary mass. Since the disclosed apparatus eliminates human contact at any time during the severing and cutting of the individual and discrete laminates forming the layered construction, contamination is not a factor.

In one embodiment, the dies in the disclosed apparatus are placed inverted and kept stationary during cutting, thus eliminating the need for costly, heavy-duty hydraulic or air pressure systems. Further, the dies can function to accumulate the necessary quantities of individual discrete laminates needed for either fabrication of an article or article part.

The disclosed apparatus is an optimized factory tool well suited for the production of large numbers of composite centrifuge rotor billets with accuracy, repeatability and quality. Further, by linking additional punching and cutting mechanisms, multiple systems may be operated by a single controller. Such flexibility provides high volume manufacturers the ability to optimize batch runs for best cost/volume ratio.

In the following description, the strength of material properties of the materials will differ in differing directions. This being the case, terms for these various properties will be used. The reader will understand that isotropic material properties are the same in essentially all directions. Anisotropic strength properties are present when fiber reinforces an individual layer. Where the fibers are laid out in a single parallel direction, the anisotropic properties of the material in tension are parallel to the fiber alignment. Where the fibers are woven to a fabric, the anisotropic properties of the material in tension are again parallel to the fibers—extending in as many different directions as the fibers in the weave.

It will be understood that the machine of this invention places fiber layers one on top of another with varying angularity between the successive layers. When a succession of such layers are placed one upon another and cured into a unitary mass, the unitary mass has "quasi-isotropic" properties. The fibers in one direction in one layer serve to reinforce fibers in another direction in an adjacent layer. Generally, a quasi-isotropic article is stronger in tension in the plane in which the laminates are laid; it is relatively weak in tension in the direction normal to the plane in which the fibers are laid.

BRIEF DESCRIPTION OF THE DRAWINGS

Other objects, features and advantages of the disclosed apparatus and process will become more apparent after referring to the following specification and attached drawings in which:

FIG. 4A, 4B, and 4C are side elevation sections and a final perspective view providing a cartoon series of a mold illustrating locally the steps of applying tension, compressing, and cutting of layers of tape or fabric to form in this case a portion of a composite rotor for a centrifuge;

DESCRIPTION OF THE PREFERRED EMBODIMENT

Figure 1:
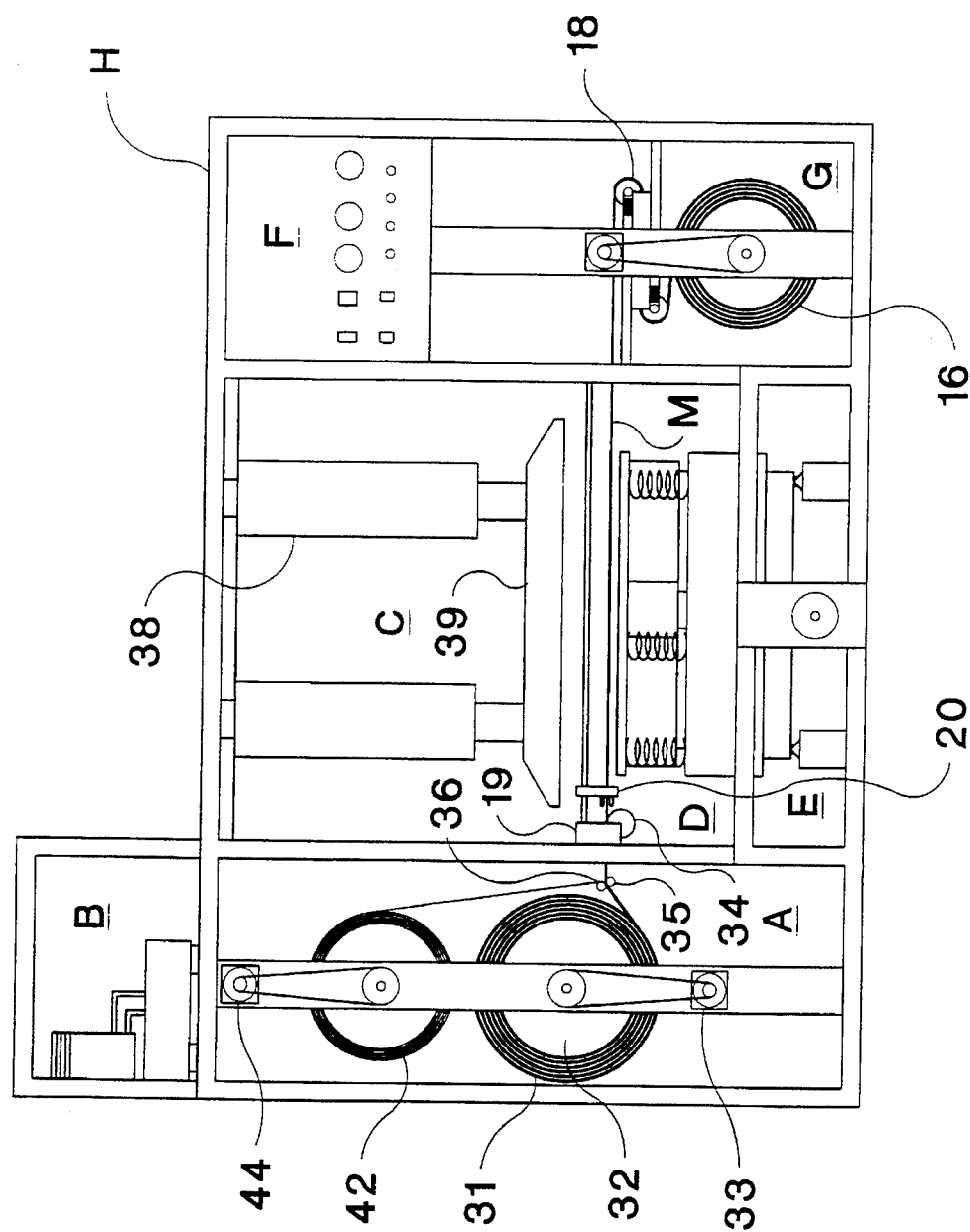
FIG. 1 is a side elevation schematic of an automatic lay-up machine according to this invention in which pre-impregnated tape provided with a release coat backing is dispensed from a refrigerated compartment and metered across a cutting table to a take-up roll.
Figure 2:
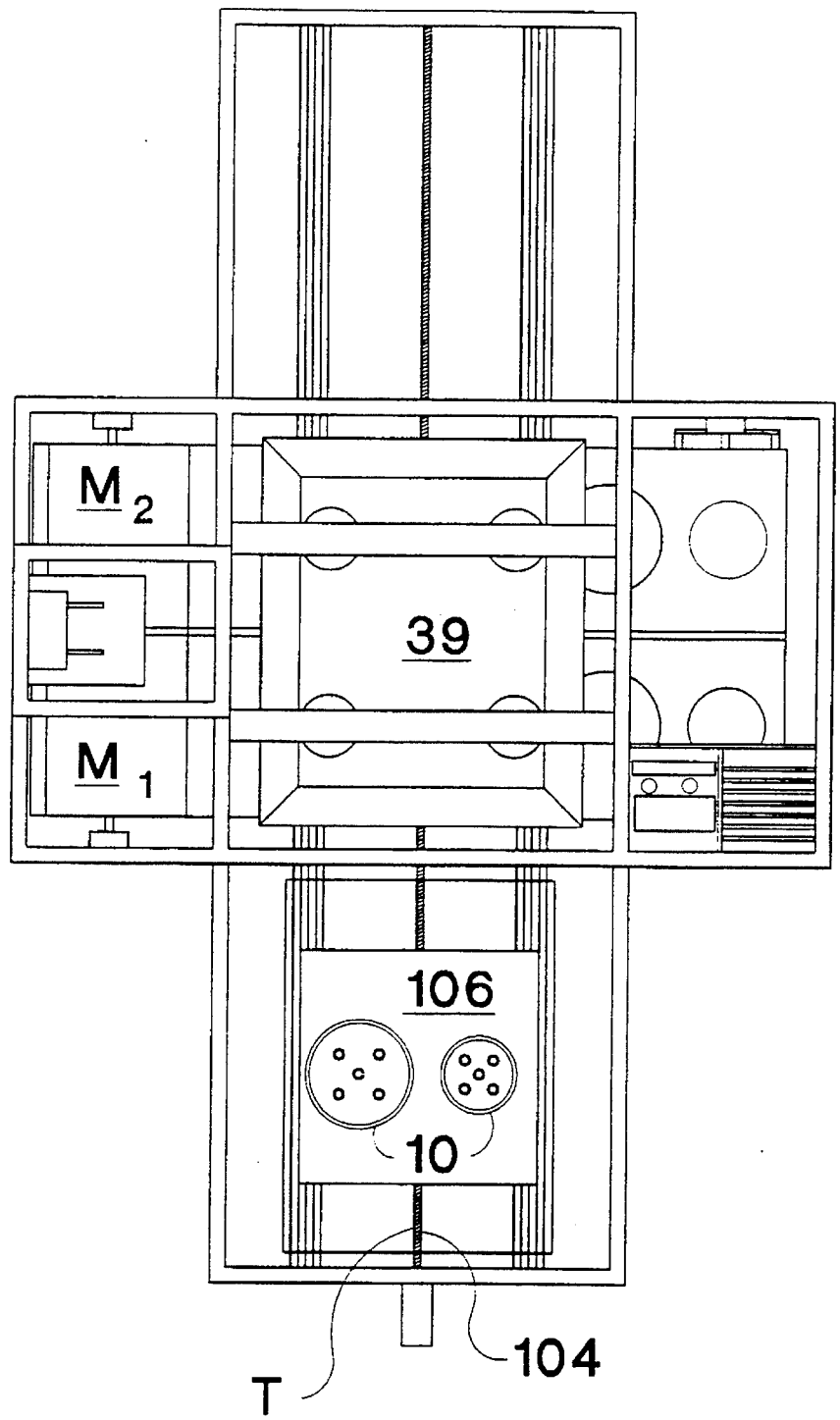
FIG. 2 is a plan view of an automatic lay-up machine similar to that of FIG. 1 showing paired tapes with cutting to a single pair of molds precision transported on a lead screw.

Referring to FIGS. 1 and 2, the automatic lay-up machine of this invention is set forth. A unitary frame H connects the discrete components together. These components include a feeder/separator mechanism A which has a communicated air conditioner/dehumidifier unit B. Solenoid housing and encoder unit 19 causes sequential intervals of material M to be advanced, stopped for cutting, and thereafter advanced again.

It is required that during the cutting step, material M be held under tension. This occurs through a carrier/tensioner mechanism 20 acting on support 21.

Presuming that material M is positioned under tension, net shape die cutting and punching mechanism C causes individual laminates to be cut from material M under tension. Upon cutting, each of the laminates passes to debulking and compacting mechanism D. It is here that the severed material is compacted. In the case of pre-impregnated material M, adhesion occurs. In the case of material M which is fabric that is not impregnated, debulking and compacting mechanism D serves to compress the layers for subsequent resin injection and curing.

Indexing mechanism E controls rotation of the respective cutter dies 10. This mechanism is schematically shown in FIGS. 1 and 6B. This drive and indexing mechanism E causes programmed rotation of the dies with respect to material M after each respective cut. When it is remembered that material M has composite fibers aligned with respect to the material—usually parallel to and sometimes both parallel to and normal to the direction of conveyance—indexing of cutter dies 10 causes the fibers of successive layers to have differing alignments. As will hereafter become more apparent in the rotor examples contained herein, such differing alignment between differing layers will impart quasi-isotropic resistance to centrifugal spin with respect to the finally assembled article.

Controller housing unit F contains conventional solid state controllers—which controllers will hereafter be set forth.

Scrap spool and upper tensioner mechanism G provides a measured tension force on material M at the time that it is cut. Further, since the respective cutter dies 10 are spaced so as to leave a scrap webbing sufficient to transmit tension to the newly advanced segment of material M. This will be further discussed hereafter.

Referring briefly to FIG. 2, a transverse motion mechanism for the die plate T is present. This mechanism is available for transport of the cutter dies 10 from the cutting table to enable debulked laminates to be further processed.

It should be noted in passing that FIG. 2 illustrates a machine according to this invention where materials $M_1$ and materials $M_2$ are dispensed. Two consequences can follow from this arrangement of dual strips.

First, differing layers can have differing materials. For example, one layer can be made from materials $M_1$ and the next sequential layer from materials $M_2$. Preferably, these respective materials will have differing anisotropic properties.

Second, it is possible to have differing materials incorporated to the same layer. For example one half of the dies can be of one material in a first cutting motion. The remaining half of the dies can be from the second material in a second cutting motion. Carrying this logic further, the die can be wider than the material used with one cut filling up a first portion of the die and the remaining portion of the die being filled during a second cut.

Having generally described the sections of the apparatus, a detailed description of operation can now be specified.

Referring to FIG. 1, roll 31 of material M which is here pre-impregnated unidirectional fiber tape or woven fabric tape is placed over spool 32 that is driven by motor 33 for unwinding the spirally wound material. Material M is fed through roller guides 35 while the backing paper 37 of material M is picked up by take-up spool 42 driven by motor 44. Mechanical wedge 36 placed between roller guides 35 helps separate the fiber or fabric tape from the paper backing. After it separates from the paper backing, material M first passes through solenoid housing and encoder unit 19 which determines the amount of travel by material M prior to each cutting of laminate sections at cutter dies 10.

Material M is here pre-impregnated. Such material is highly sensitive to temperature and humidity—especially where initial lay-up of product is concerned. This being the case, material M is placed in an isolated atmosphere environment communicated to air conditioner/dehumidifier unit B. It should be noted that where material M is refrigerated to about 0° Centigrade, ease of handling and cutting results.

It has been emphasized that the disclosed apparatus can contain various widths of material M. In the case of narrow-width tape, direct tension is not practical. Therefore the material is assisted by carrier/tensioner mechanism 20 traveling bi-directionally on support 21. Support 21 is longer than the length of press plate 39 to ensure that the material M (here a narrow tape) fully covers cutter dies 10 prior to cutting.

One of many uses of the apparatus and process set forth here is in the production of various types of centrifuge composite rotors. The reader will understand that specific features described in this document are useful in but not necessarily limited to manufacturing of composite centrifuge rotors.

Feeder/separator mechanism A is typically capable of handling widths of material from three to forty eight inches (3"–48"), but could exceed the boundary of these dimensions. For the majority of composite rotor manufacturing, the desired width of the tape or fabric is forty eight inches (48").

Material M is fed through net shape die cutting and punching mechanism C. Cutting occurs—which cutting will be more fully set forth hereafter. This cutting at cutter dies 10 leave scrap in the form of continuous scrap web 46 which netting has sufficient material remaining to enable tension for cutting to be exerted on the next incrementally advanced section of material M. This tension is exerted by self-adjusting, spring-loaded, scrap spool and tensioner mechanism G including rollers 18. Finally, collection by scrap-spool 16 driven by motor 17 occurs.

It is therefore easy to understand the cutting of an individual laminate. As material M is dispensed, paper backing material winds on take-up spool 42 while the narrow-width material M is pulled by the carrier/tensioner mechanism 20 traveling a specified length over cutter dies 10. After punching and cutting, the remaining material M is deposited over scrap-spool 16. For sequential laminates, this process is repeated.

Synchronized with the carrier/tensioner mechanism, solenoid housing and encoder unit 19 will dictate the length of travel of the carrier over the die. Spring-loaded carrier/tensioner mechanism 20 provides a safety feature. It prevents material M from breakage due to excessive tension or jamming due to excessive slack.

When a set of solenoids located in solenoid housing and encoder unit 19 are energized, carrier/tensioner mechanism 20 maintains its grip on the material M. Then, net shape die cutting and punching mechanism C moves down and punches the material against the sharp edges of cutter dies 10.

The reader will understand that composite fibers in material M are typically aligned with respect to the direction of dispensing. Almost always where material M is a tape having unidirectional fibers, such alignment is parallel to the direction of dispensing. Where material M is a fabric, at least some of the fibers will be parallel to the direction of dispensing. In any case, it is required that successive laminates have their respective fibers extend in varying directions. This variance of direction is required to impart requisite quasi-isotropic strength to the finished article. To this end, it is necessary to partially rotate or index cutter dies 10.

The planar position of each cutter die 10 is controlled by indexing mechanism E. Indexing mechanism E accurately rotates and moves the die to the next programmed position after press plate 39 elevates. At that time, solenoid housing and encoder unit 19 is reset and carrier/tensioner mechanism 20 returns to its home position. The operation is limited only by the depth of cutter dies 10 for collection of the cut material which are the individual laminates.

Press plate 39 is equipped with a press elevator 38. Press elevator 38 includes cylinders for automatically raising the press plate up and down within each cutting cycle.

Controller housing unit F contains conventional controls. This section also includes all necessary electronic interface boards, connectors and other components to facilitate direct connection and control by a personal computer.

The reader will appreciate that metering of material M dispensed will be required. Accordingly, metering wheel with attached shaft encoder 34 is utilized. As this expedience is well known in the prior art, further description will not be provided here.

Overall function of the unit can now be set forth. Spool 32 dispenses material incrementally with scrap-spool 16 and rollers 18 applying tension to material M as it is dispensed. Once an uncut section of material M is in place and under the requisite tension, cutter dies 10 separate a layer to be laminated from material M. Cut material is compressed into and debulked in this example interior of cutter dies 10. This sequence is repeated.

It will be understood that between each cutting cycle, cutter dies 10 rotate. Such rotation occurs to impart to the materials being built up a quasi-isotropic strength characteristic where the produced laminate has relative great resistance to tensile forces in the plane of the laminate.

It will be thus seen that the disclosed apparatus applies the proper amount of tension and produces reliable, repeatable movement, especially in the case of where material M includes narrow width pre-impregnated tape.

Figure 3:
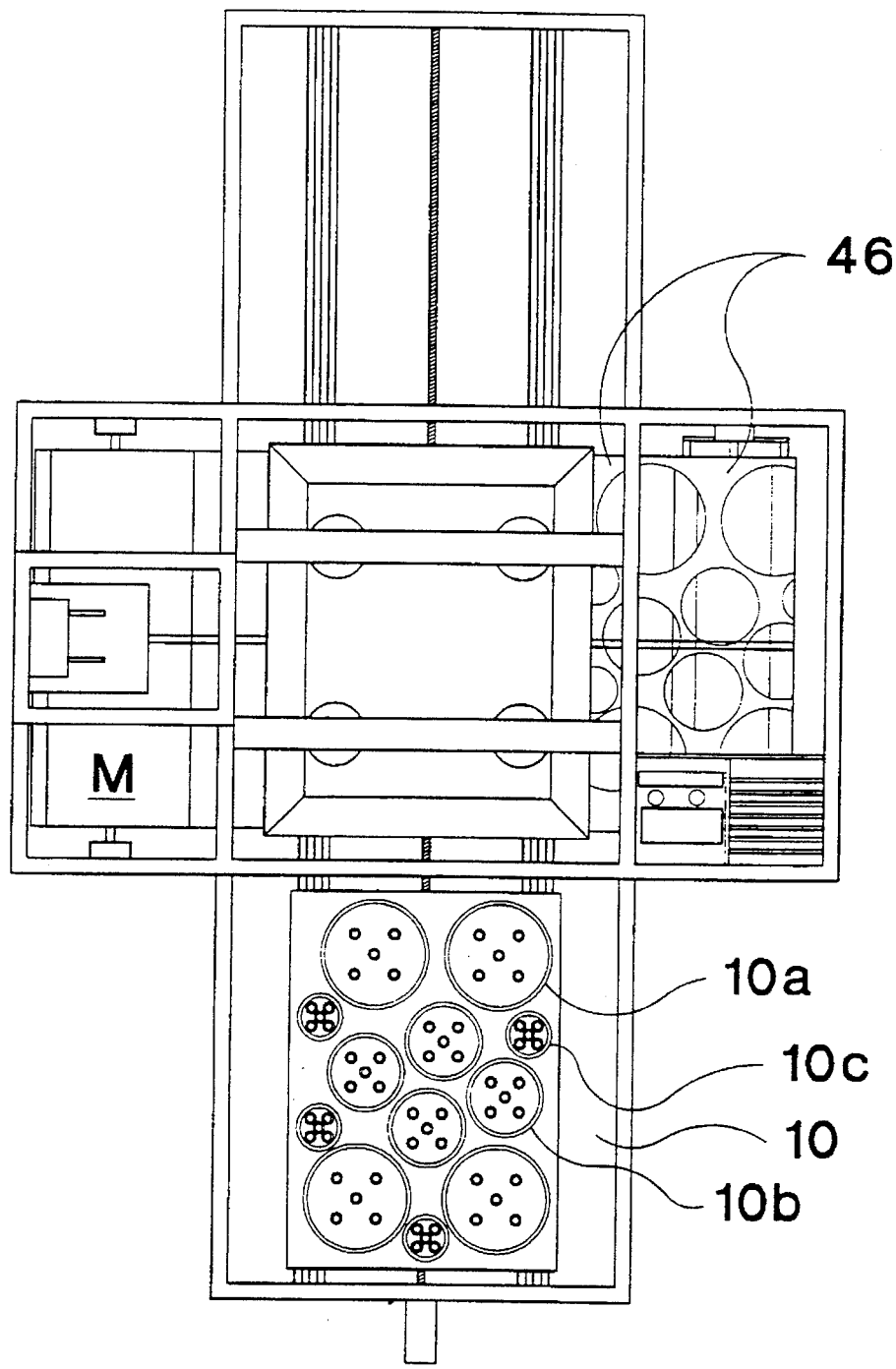
FIG. 3 is a plan view similar to that shown in FIG. 2 with an automatic lay-up machine having a multitude of cutting dies cutting a single broad laminate layer leaving only sufficient interval within the scrap material to enable tension to be applied across the cutting dies.

In the case of the full width material M illustrated in FIG. 3, it is sufficient if tension be applied between roll 31 on the supply side and rollers 18, scrap-spool 16 on the take-up side. Where the material narrows, such as materials $M_1$ and $M_2$ illustrated in FIG. 2, a separate tensioner unit is required. This unit is schematically illustrated in FIGS. 10A–10D.

Referring to FIG. 10A–10D, the processing of one of the two materials $M_1$ or materials $M_2$ from FIG. 2 is shown. In FIG. 10A, support 21 is shown pressing carrier/tensioner mechanism 20 on both sides of material M. Large cutter die 10 is shown cutting single rotor laminate L from material M which because of its reduced width would otherwise be drawn away from carrier/tensioner mechanism 20 in the direction of large cutter die 10. In FIG. 10B, cutting is complete, support 21 retracted and carrier/tensioner mechanism 20 moved against the direction of conveyance of material M by a linear motor (not shown). In FIG. 10C, clamping of support 21 again occurs with a new section of material M being held for cutting. FIG. 10D illustrates the next sequential cut with large cutter die 10 taking the next sequential single rotor laminate L from material M.

It will be noted that the illustrated mechanism can act to produce tension in two ways. First, and between the carrier/tension mechanism 20 on either side of die 10, material M cannot move toward die 10 during cutting of single rotor laminate L. Secondly, tension can also be generated between roll 31 and carrier/tensioner mechanism 20. This can occur by either applying tension from roll 31 or alternately having carrier/tensioner mechanism 20 move away from roll 31.

The number of material-feed cycles implemented by the encoder and carrier/tensioner mechanism corresponds to the number of layers required in a particular batch operation. This is typically dictated by the width of the composite tape, and the physical dimensions and number of cutter dies 10 included in one punching cycle.

Die Cutter

Figure 4A:
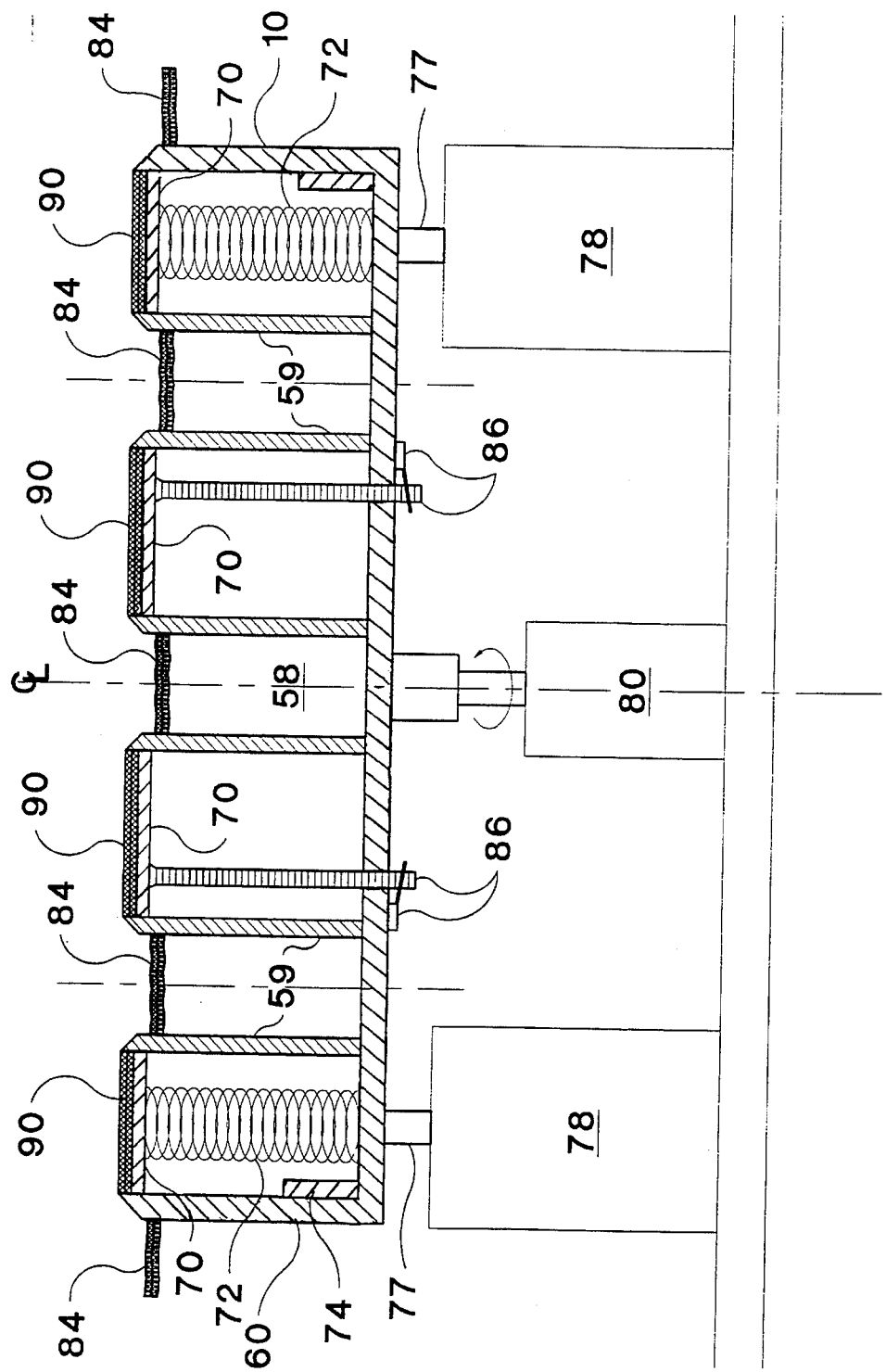
Figure 4B:
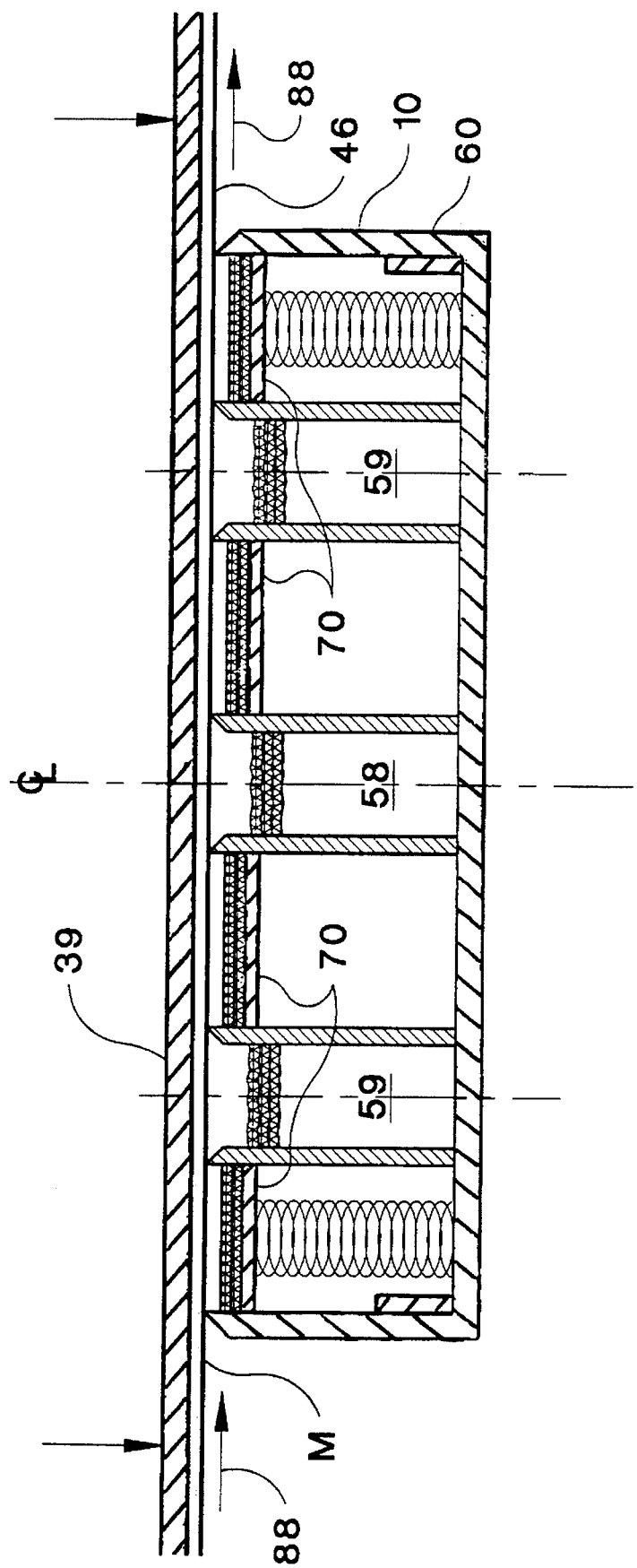

Referring to FIGS. 4A, 4B, and 4C, cartoon views of a mold illustrating locally the steps of applying tension, compressing, and cutting of layers of material M which can be either tape, fabric or impregnated fiber is illustrated. In this particular case, cutting to form a portion of a composite rotor for a centrifuge is illustrated.

Referring specifically to FIGS. 4B and 4C, in most die cutting machinery, cutter dies 10 within net shape die cutting and punching mechanism C and press plate 39 will move together to implement punching. This demands large forces from a costly heavy-duty hydraulic or high pressure air system. It will be appreciated that cutter dies 10 are inverted and kept stationary during cutting, thus separating the press and die functions. During the punching step, the only component that moves is press plate 39. This configuration eliminates the need for such heavy-duty punching mechanism, and lowers cost of manufacturing and maintenance. This concept of separating die and press opens up the door for many heavy duty fabrication applications with the maneuverability of light weight components.

Net shape die cutting and punching mechanism C is actuated by press elevator 38 with hydraulic or air-driven cylinders connected to press plate 39. (See FIG. 1.) This is controlled electronically and functions per standard prior art instructions from the controller. As will hereafter more fully be set forth, press plate 39 is also utilized as a compactor.

Cutting and Stacking with Mechanical Die(s)

Referring to the cartoon views of FIG. 4A, 4B, and 4C, views are illustrated locally with the steps of applying tension, compressing, and cutting of material M, either layers of tape or fabric to form in this case a portion of a composite rotor for a centrifuge. Before understanding the function, it is necessary to see and understand the profile of a single laminate. This is illustrated in FIG. 4D.

Figure 4D:
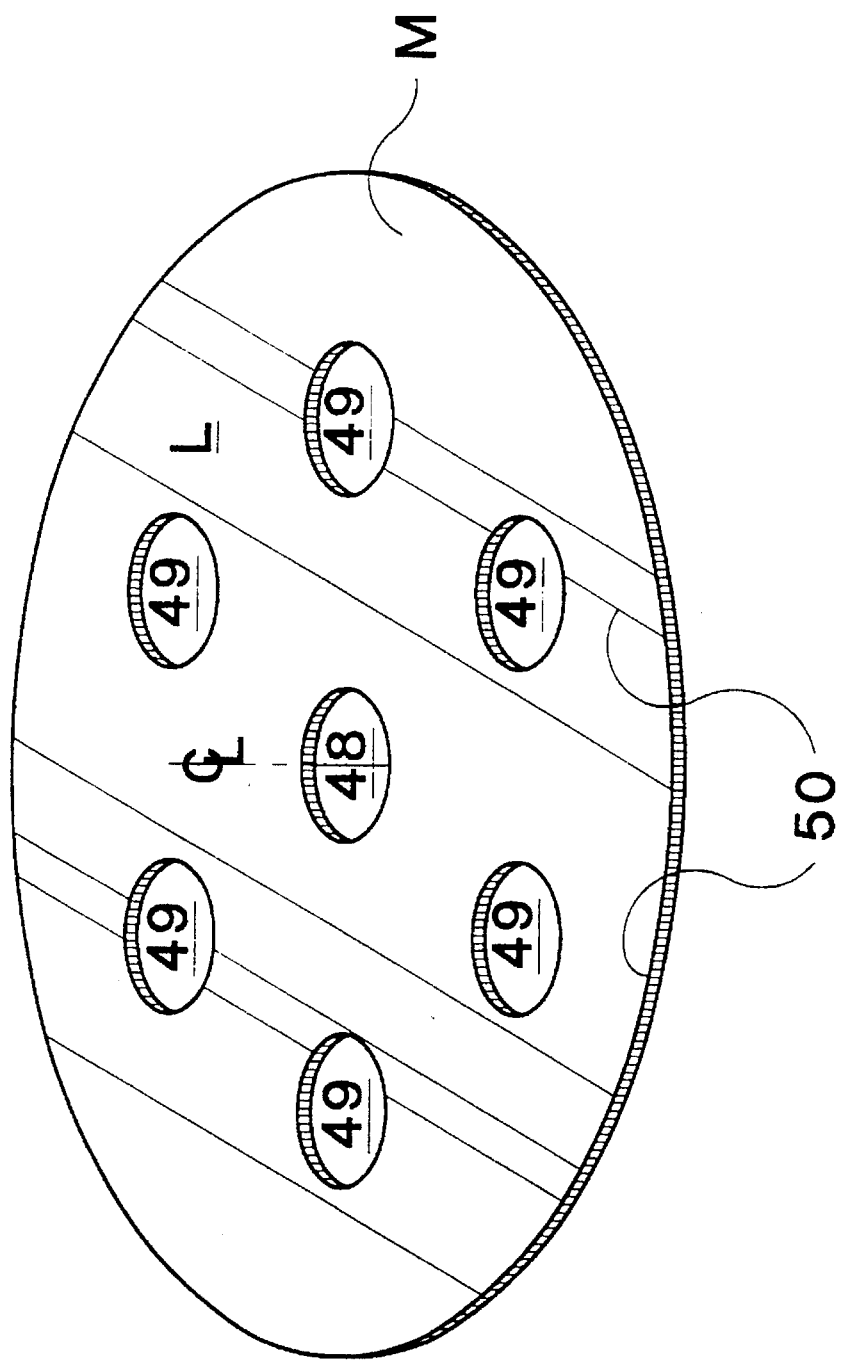
FIG. 4D is a perspective view of a single laminate layer.

Referring to FIG. 4D, single rotor laminate L is illustrated. This rotor laminate is interrupted by central hub aperture 48 and six sample tube apertures 49. As has been previously emphasized, single rotor laminate L is cut from material M which can be either woven fabric or alternatively unidirectional tape. In the illustrated case, unidirectional tape having composite fibers 50 is illustrated.

Figure 5B:
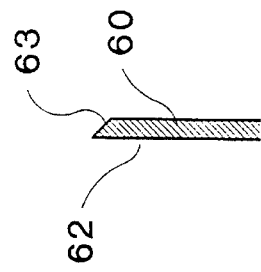
FIGS. 5A, 5B and 5C are respective details of a single rotor laminate and the cutter die which produces the laminate together with a section illustrating the peripheral cutter of the cutter die, an aperture cutter of the cutter die and finally the cutter at the side wall of the cutter die.
Figure 5A:
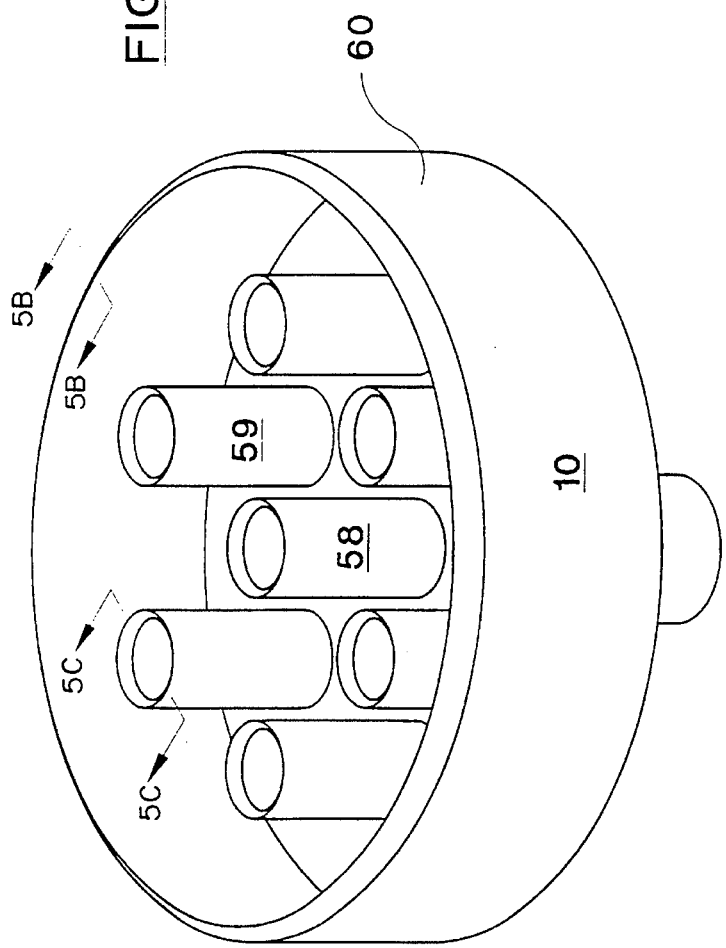
Figure 5C:
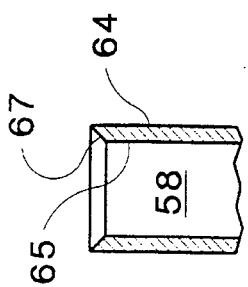

Referring to the perspective view of FIG. 5A, and presuming that single rotor laminate L is to be cut from material M, the construction of cutter die 10 which effects this cutting can now be set forth. Cutter die 10 includes peripheral wall 60 which opens to knife edge 63 at the top. As can be seen in FIG. 5B, knife edge 63 has straight wall 62 faced into the interior of cutter die 10 so that single rotor laminate L can be received into the interior. Each of central hub aperture 48 and sample tube apertures 49 are formed by respective central hub cutter 58 and sample aperture cutter 59. As can be seen in FIG. 5C, central hub cutter 58 includes hub knife edge 67 with straight wall 64 disposed to the outside of central hub cutter 58 so that single rotor laminate L can be accommodated on the outside of the central hub cutter.

Having set forth the construction of the cutting edges of cutter die 10, attention can now be devoted to the interior of the die where accumulation of a plurality of single rotor laminates L occurs. This is illustrated with respect to FIG. 4A.

Specifically, and having the same profile as single rotor laminate L, bottom collection plate 70 serves to collet single rotor laminates L as they are cut into the interior of cutter die 10. Bottom collection plate 70 is biased upwardly by springs 72, which springs 72 and collection plate 70 yield downward as single rotor laminates L accumulate. Such yielding will continue until bottom collection plate 70 bottoms out on stops 74.

Referring further to FIG. 4A, cutter dies 10 rotate between each punching step. To facilitate this rotation, peripheral bottom die-supports 77 rotate on bracing annulus 78 when indexed by indexing mechanism 80, which typically includes an interior stepper motor. Indexing mechanism 80 is indexed to provide the correct angular placement of composite fibers 50 in material M.

In centrifuge rotor fabrication, presence of cell holes or cavities demands a perfectly balanced structure. For centrifuge rotor fabrication, indexing is done according to number of cell holes and alignment of fiber with load-bearing sections of the cavities having uninterrupted composite fibers 50 for anisotropic resistance to centrifugal forces.

Scrap material 84 (FIG. 4, Ref. 10) is cut and collected inside central hub cutter 58 and sample aperture cutter 59. After collection of sufficient stacked single rotor laminates L, all scrap material may be re-cut and used later for reinforcement in the construction of centrifuge rotors with less demanding strength requirements.

Referring again to FIG. 4A, indexing mechanism 80 located under cutter die 10 also controls the height of accumulation of single rotor laminates L below the cutting surfaces of the die. Each time press plate 39 makes contact with the top of the die, bottom collection plate 70 is vertically indexed down by vertical indexer 86 one notch, holding bottom collection plate 70 at its lower position, exerting pressure on springs 72. This process is repeated until bottom collection plate 70 rests on top of stops 74 or alternately reception of a signal from indexing mechanism 80 which signals the maximum amount of material that can be collected inside of the die has been reached. It will be appreciated that the illustrated process contributes to the debulking of single rotor laminates L accumulated interior of cutter die 10.

Having set forth the construction of a typical cutter die 10, the sequential operation of the cutter die can be easily understood with respect to FIGS. 4B. In FIG. 4B, material M has been advanced in the direction of arrows 88 and placed under tension by scrap spool and tensioner mechanism G (See FIG. 1). Press plate 39 is poised for downward movement once material M ceases motion.

With respect to FIG. 4C, press plate 39 has made its downward movement. Single rotor laminate L has been accumulated—and debulked—interior of cutter die 10 with respective scraps either forming continuous scrap web 46 through which tension can be exerted or alternately cut pieces 90 which are temporarily accumulated interior of central hub cutter 58 or sample aperture cutter 59. This process—with indexing by indexing mechanism 80 continues as single rotor laminates L are accumulated in sufficient quantity to produce sufficient layers from which either an article or article part can be fabricated.

Returning to FIG. 2 and FIG. 3, it can be seen to increase automation and productivity, a series of different size cutter dies 10 may be placed together and used as an assembly. In such cases, material is collected in different dies with cell holes already cut, laminate compacted and ready for the curing step.

Figure 7:
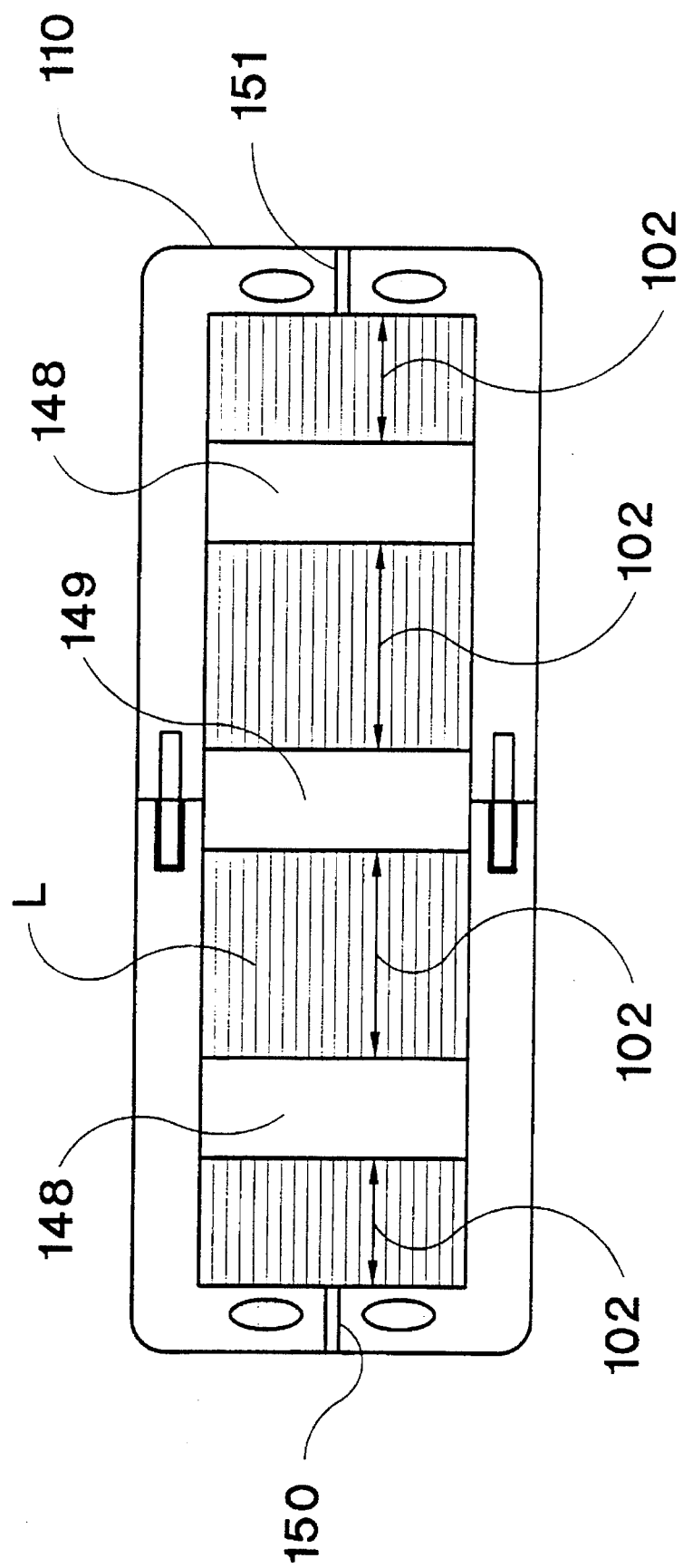
FIG. 7 is a side elevation of a curing mold into which precut quantities of fabric have been transferred and compressed with the filled mold shown being injected with resin for curing of the contained fiber layers into a composite laminate.

Referring briefly to FIG. 7, it may be required that debulking occur in mold 110. This being the case, the individually cut single rotor laminates L can be removed and placed into mold M. As will hereafter appear, mold M will be subsequently used for molding of groups of single rotor laminates L by resin transfer molding. Here, however, only debulking is illustrated with respect to mold M.

Multi-die Mechanism for Cutting Laminates with Angular Holes

In some cases, as in angle centrifuge rotors where the tube cavities within the rotor are placed at an angle to the axis of rotation, the product may contain non-perpendicular holes. Where the article is fabricated as a cylindrical billet, machining these holes is a difficult, slow and expensive process which may damage structural integrity of the billet.

Figure 8:
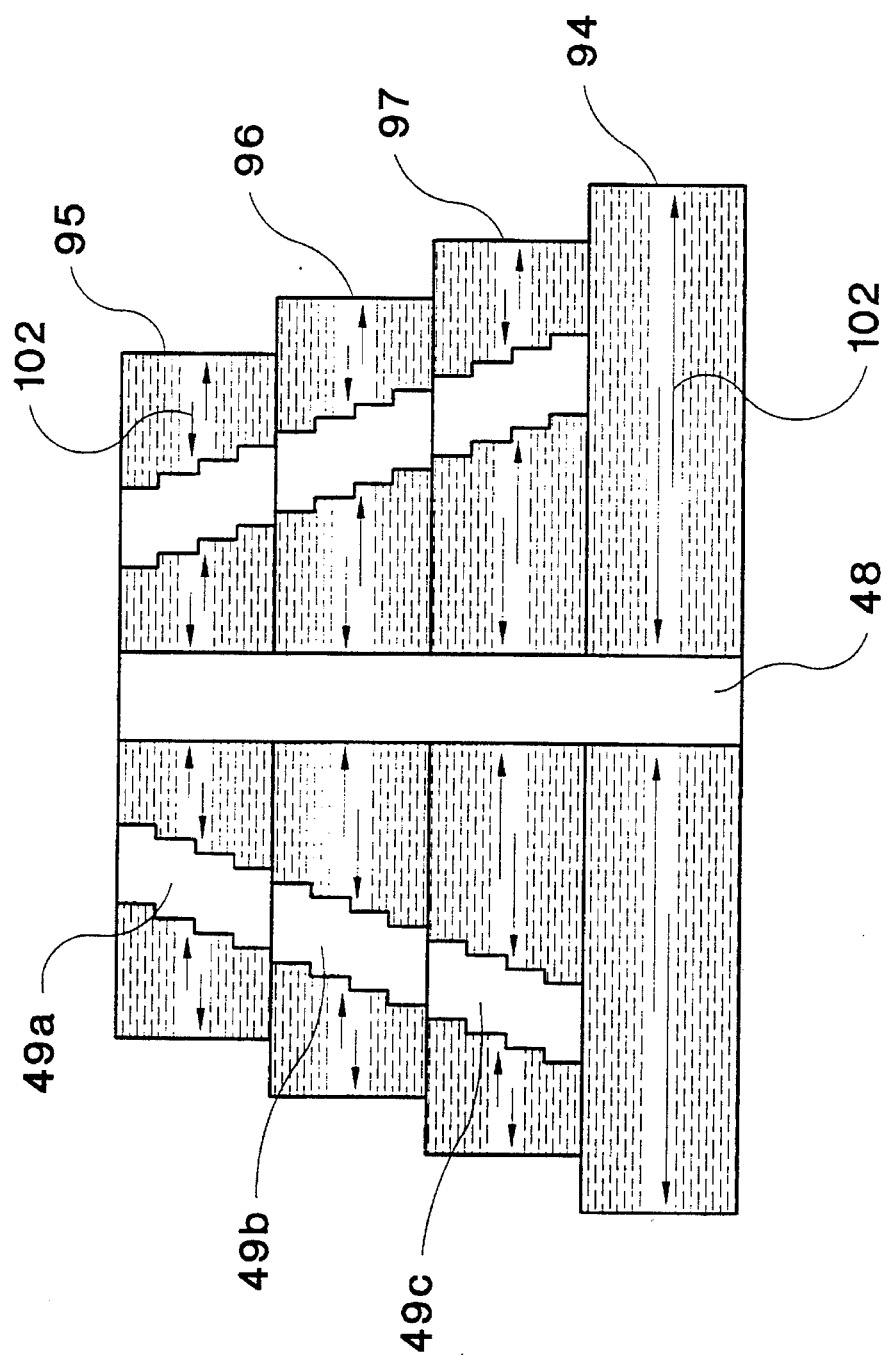
FIG. 8 is a side elevation of four so-called billets being laid up and joined together to form a composite rotor construction from which minimal machining can occur to form a completed rotor product.

This difficulty can be solved by the fabrication of angle rotors utilizing large cutter dies 10*a*, medium cutter dies 10*b*, and small cutter dies *c*. In the example given in FIG. 8, a centrifuge rotor R is illustrated which includes lower solid disc 94 and upper small disc 95, middle medium disc 96 and large bottom disc 97. The four lower solid disc 94, upper small disc 95, middle medium disc 96, and large bottom disc 97 are assembled as indicated in FIG. 8 and finished to produce centrifuge rotor R.

It will be noted that three cell holes $49_A$, $49_B$ and $49_C$ at certain distances offset form the start of sample apertures 100 in centrifuge rotor R. With these respective sample tube apertures 49 in each of upper small disc 95, middle medium disc 96, and large bottom disc 97 at differing distance from central hub aperture 48, machining of sample tube apertures 100 is greatly simplified.

Figure 6A:
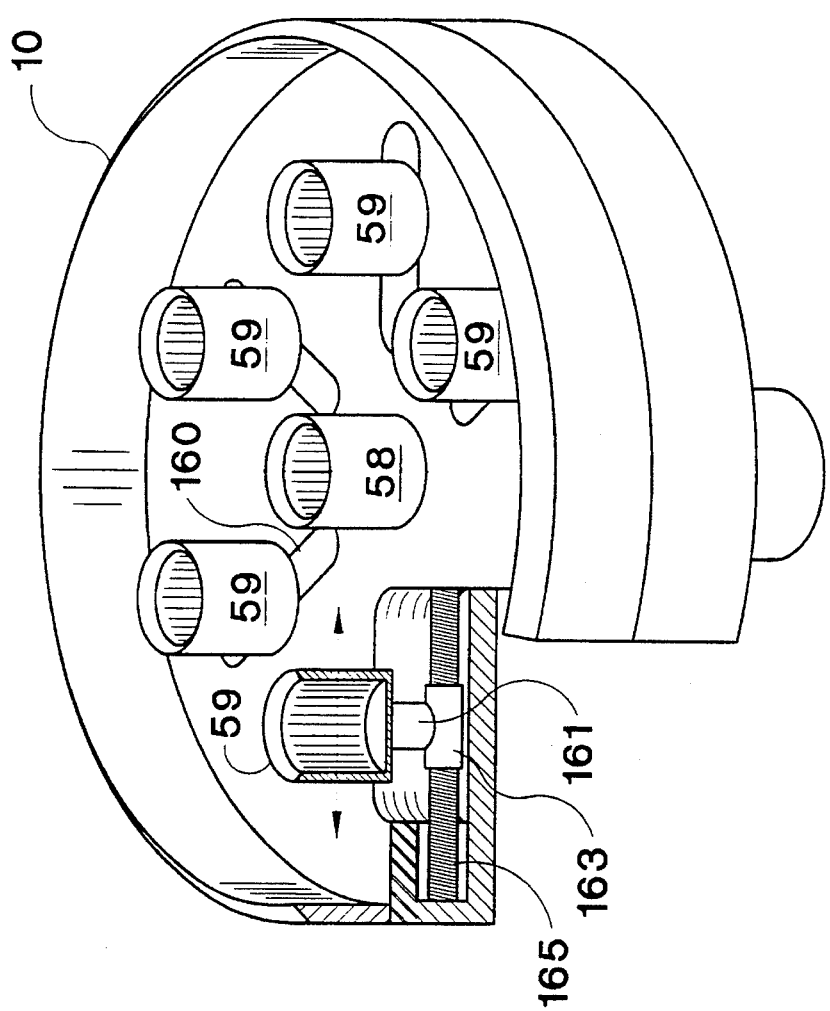
FIGS. 6A and 6B are respective perspective views of a mechanism for indexing the sample tube aperture cutters so that upon final fabrication of a laminate layer near net shape cutting of the sample tube receiving aperture can occur.
Figure 6B:
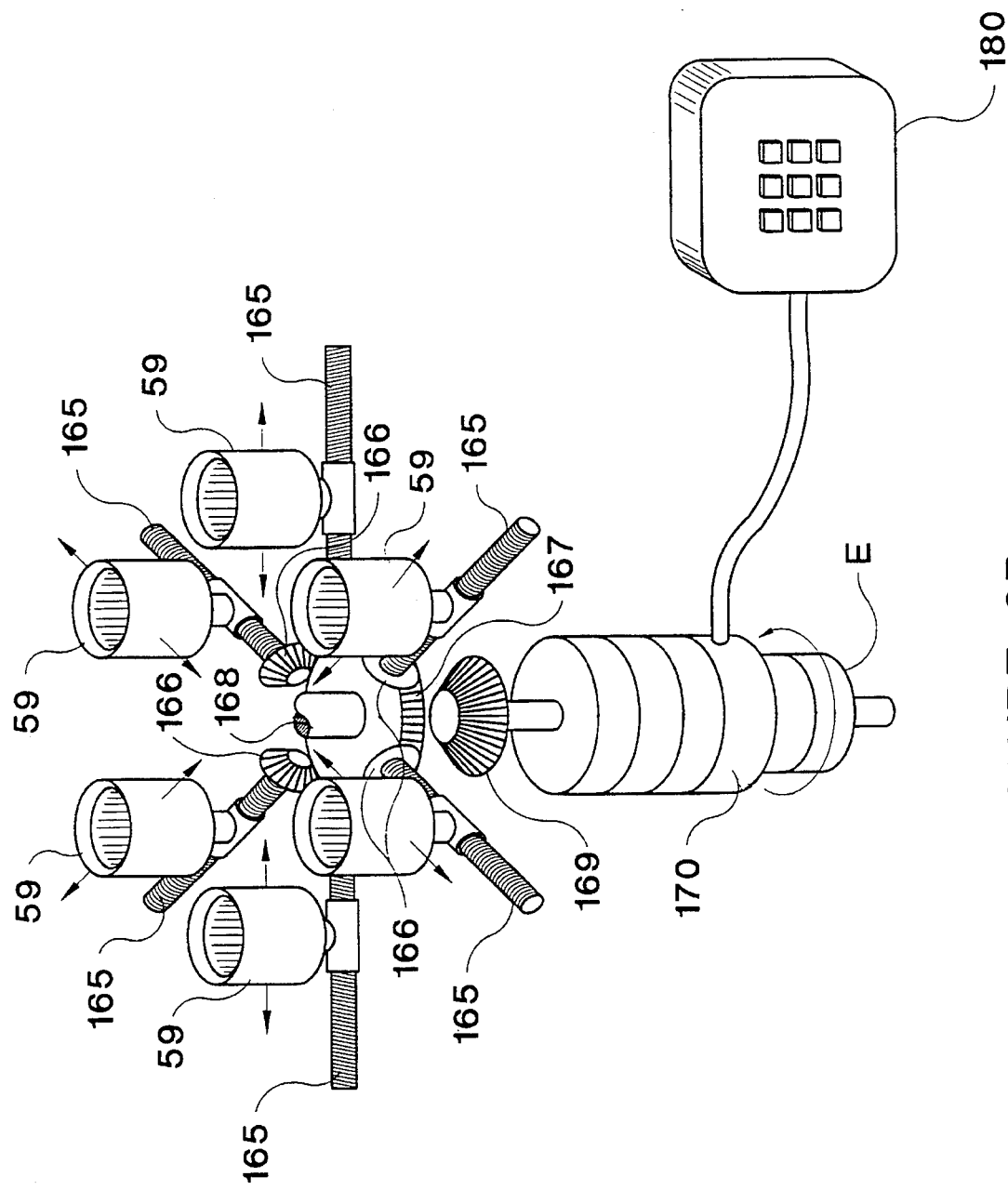

Referring to FIGS. 6A and 6B, a further ability of this invention to form sample tube apertures 49*a*–*c* is illustrated. Referring to FIG. 6A, each of sample aperture cutters 59 is mounted within radially elongate slot 160. Each radially elongate slot 160 has threaded shaft 165 mounted for rotation therein. Threaded boss 163 and support 161 cause sample aperture cutter 59 to translate when threaded shaft 165 rotates.

Referring to FIG. 6B, a mechanism for uniform rotation of all threaded shafts 165 with uniformity is disclosed. In this view, all six threaded shafts 165 are illustrated. Each threaded shaft 165 includes a bevel gear 166 at the end thereof. These bevel gears 166 in turn mate with central bevel gear 167 mounted about die rotating shaft 168. Central bevel gear 167 is in turn rotated by driving bevel gear 169 attached to stepper motor 170. Simply stated, with appropriate control of stepper motor 170, uniform rotation of all threaded shafts 165 occurs with consequent uniform radial displacement of all sample aperture cutters 59. It thus will be seen that there is disclosed a mechanism which can produce the radially stepped construction of sample tube apertures 49*a*–*c* illustrated in FIG. 8.

Figure 9:
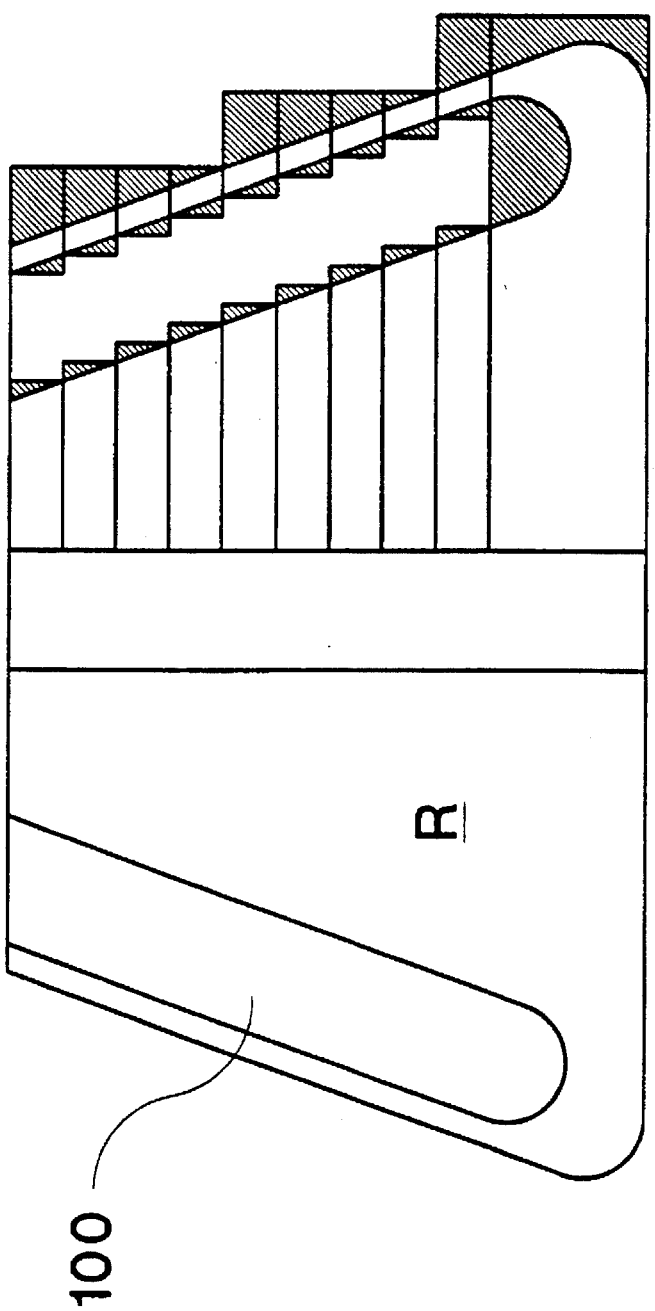
FIG. 9 is schematic of the material to be machined for completion of the rotor assembly; and, FIGS. 10A, 10B, 10C and 10D are perspective schematics of the solenoid carrier/tensioner mechanism illustrating the operation of the mechanism in a cartoon series.

These lower solid disc 94, large bottom disc 97, middle medium disc 96, and upper small disc 95 are stacked (FIG. 8) and cured together, having the smallest on top and the largest at the bottom, thereby producing a near-net shape of the rotor. As illustrated in FIG. 9, the cured billet is machined to final shape of the rotor. Benefits of this process of incorporating cell hole cutting with one single punching step and producing multiple stacks to form the rotor billet, includes: shorter post-lamination machining time, lower production cost, less scrap material and, higher structural integrity due to uniform resin bleeding during the curing step.

To understand the phenomena of uniform resin bleeding, reference can be made to FIG. 7. It will be understood that when single rotor laminates L are bonded one to another by resin, resin will bleed as illustrated by bleed paths 102. Striving for uniform resin bleeding is always a critical aim. Without uniform resin bleeding, fiber kinking, resin bulging, and air gaps all reduce the strength and structural integrity of centrifuge rotor R ultimately fabricated. Here, however, bleed paths 102 extend not only to the periphery of centrifuge rotor R, but to central hub aperture 48 and sample tube apertures 49. Since bleeding can occur at these particular outlets, a more uniform and structurally sound centrifuge rotor R results.

Transverse Motion

Referring to FIG. 2, it will be seen that lead screw 104 enables table 106 to traverse material M. This imparts to cutter dies 10 transverse motion. This transverse motion feature provides the capability of fabricating wider, non-uniform laminates using standard width roll of material M. This concept of moving the die in transverse direction permits production of laminated parts wider than the actual width of the tape.

By moving the die plate in transverse direction over lead screw 104 and using multiple feeder/separator mechanisms A, the apparatus is able to fabricate hybrid laminates, using tapes such as carbon/glass, carbon/Kevlar® or mixture of all three materials. This hybrid lamination feature will give the designer the ability to take advantage of properties of different material without labor-intensive hand lay-up operation.

It can be seen that this apparatus may be designed and used as an efficient high-volume production tool. By selecting the press as wide as the width of the tape, and utilizing a number of the dies, it is possible to increase the production rate of smaller laminates at a fraction of time required to fabricate them individually.

Production rates can also be increased for narrower tape, by extension of the system in the carrier direction by means of multiple press plates along the travel length of the tape.

Drive Indexing Mechanism

Uni-directionality is an inherent disadvantage in composite fibers. Structures fabricated from uni-tape are strong only in one direction. To get around this disadvantage, material manufacturers offer more expensive woven fabrics which have the strength and stiffness in two directions. Woven fabrics solve only part of the problem but does not address the inherent disadvantage of uni-directionality.

With the indexing feature of the dies laminates could be tailored to designer's specifications using less expensive unidirectional tape and achieving better structural components (higher fiber to resin ratio). Die indexing is achieved by indexing mechanism 80 and mounting the die at peripheral bottom die-supports 77 on bracing annulus 78. Cutter dies 10 are then rotated by indexing mechanism 80. The die indexing mechanism allows cutting each layer of fiber tape at a different angle with respect to the layers of fiber tape under and over it.

Hence, the die is able to rotate and index different lengths of the cut material per design specification without outside intervention, thus eliminating any chance of contamination. Indexing is a critical feature for fabrication of well-balanced, quasi-isotropic, strong laminates with high structural integrity (such as centrifuge rotor billets) using less expensive material. Further, indexing capability of the die permits fabrication of well-balanced quasi-isotropic structural parts critical for the production of ultra centrifuge rotors which may spin as high as 100,000 revolutions per minute and require containment of sample tubes under 600,000 g-forces within the rotor cell holes.

Compacting and Debulking

In order to reduce the thickness of the laminates, the cut material must be compacted and debulked automatically throughout the operation. Cutter dies 10 cut single rotor laminates L to the precise profile required for article fabrication. Further, regulated pressure or vacuum can be applied in addition to pressure from press plate 39 over the die(s). In this way, cutter dies 10 can continuously compact, debulk, and consolidate single rotor laminates L. In the case of dry fibers, the illustrated apparatus is able to cut twice as much material as is the case with pre-impregnated tape within the same die volume when cut material is compacted.

The reader will remember that the present apparatus and process has the capability of cutting, debulking, and preparing for impregnation with resin, fiber woven from composite threading. This being the case, reference to FIG. 7, resin mold 110 which can be utilized with this invention.

Resin mold 110 is illustrated with sufficient single rotor laminates L all fabricated from material M woven from composite fibers. Further, these materials have been removed from cutter dies 10 and placed within resin mold 110.

Resin mold 110 has central hub cylinder 149 and peripheral sample tube aperture cylinders 148. These receive the respective single rotor laminates L at their central hub aperture 48 and sample tube apertures 49. Resin mold 110 with the equivalent profile to single rotor laminate L bears down on single rotor laminates L to fully debulk and compress the individual laminates. When such compression is fully occurred, resin can be injected in resin injection tubes 150 with preferably a vacuum applied at exit tube 151. Further, curing of the unitary mass can occur within the illustrated resin mold 110.

It will be understood that the profile of cutter dies 10 is such that they can readily be altered for this debulking and resin injection function. Unfortunately, this has the disadvantage of otherwise occupying the cutter dies; it is therefore preferred that where woven fabric is used, resin molds 110 be utilized.

It will be understood that this invention is uniquely adapted to the construction of articles having complex internal sections, such as single rotor laminates L having central hub apertures 48 and sample tube apertures 49. It is possible to approach the outline of the finished article closely by utilizing the apparatus of this invention. Further, the disclosed apparatus avoids the difficulty of the prior art in that the edges of single rotor laminates L are already for bonding into the final product.

What is claimed is:

1. A method for cutting individual single rotor laminates from material having composite fiber for a fabrication of a centrifuge rotor having a rotating body, a central hub aperture, and radially distributed sample tube apertures, said cutting mold comprising:

providing a mold body;

providing a knife edge defining a perimeter of said single rotor laminate supported from said mold body;

providing a central hub cutter having a hub knife edge for forming in the middle of said single rotor laminate a central hub aperture supported from said mold body;

providing a plurality of sample aperture cutters, said sample aperture cutters radially distributed about said central hub cutter supported from said mold body;

providing a plate for confrontation by said knife edge, central hub cutter, and sample aperture cutter;

providing material having fiber overlying said knife edge, central hub cutter, and sample aperture cutter;

placing said material between said plate, and mold body at said knife edge, central hub cutter, and sample aperture cutter;

moving said mold toward said plate to sever an individual laminate; and, rotating said mold body relative to said fibers in said materials for causing said sample aperture cutters to rotate about said central hub cutter with respect to fiber in material cut by said cutting mold.

2. A method for cutting individual single rotor laminates from material having composite fiber for the fabrication of a centrifuge rotor according to claim 1 and further including the steps of:

moving said sample aperture cutters radially with respect to said central hub cutter between successive cuts of said laminates.

3. A cutting mold for forming individual single rotor laminates from material having fiber for a fabrication of a centrifuge rotor having a rotating body, a central hub aperture, and radially distributed sample tube apertures, said cutting mold comprising:

a mold body;

knife edge defining a perimeter of said single rotor laminate supported from said mold body;

a central hub cutter having a hub knife edge for forming in the middle of said single rotor laminate a central hub aperture supported from said mold body;

a plurality of sample aperture cutters, said sample aperture cutters radially distributed about said central hub cutter supported from said mold body; and, means for rotating said mold body for causing said sample aperture cutters to rotate about said central hub cutter with respect to fiber in material cut by said cutting mold.

4. A cutting mold for forming individual single rotor laminates from material having fiber for the fabrication of a centrifuge rotor according to claim 3 and further including:

means for moving said sample aperture cutters radially with respect to said central hub cutter.

5. A cutting mold for forming individual single rotor laminates from material having fiber for the fabrication of a centrifuge rotor according to claim 4 and further wherein said means for moving includes:

slots defined in said mold body, said slots radially extending with respect to said central hub cutter;

means operably connected to said sample aperture cutters for moving said sample aperture cutters in said slots in uniform increments relative to said central hub cutter.

* * * * *